United States Patent
Lee et al.

(10) Patent No.: US 9,739,369 B2
(45) Date of Patent: Aug. 22, 2017

(54) METHOD AND APPARATUS FOR SELECTING GEAR WHEN SSC IS RELEASED

(71) Applicant: HYUNDAI MOTOR COMPANY, Seoul (KR)

(72) Inventors: Hyung-Ju Lee, Yongin-si (KR); Kyu-Jin Jo, Suwon-si (KR); Seong-Kyu Park, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 145 days.

(21) Appl. No.: 14/956,031

(22) Filed: Dec. 1, 2015

(65) Prior Publication Data

US 2016/0327150 A1  Nov. 10, 2016

(30) Foreign Application Priority Data

May 8, 2015 (KR) .................. 10-2015-0064525

(51) Int. Cl.
| | |
|---|---|
| *F16H 61/02* | (2006.01) |
| *F16H 59/66* | (2006.01) |
| *F16H 59/54* | (2006.01) |
| *F16H 59/44* | (2006.01) |
| *F16H 59/48* | (2006.01) |

(52) U.S. Cl.
CPC ......... *F16H 61/0213* (2013.01); *F16H 59/44* (2013.01); *F16H 59/48* (2013.01); *F16H 59/54* (2013.01); *F16H 59/66* (2013.01); *F16H 2059/663* (2013.01); *F16H 2061/0227* (2013.01)

(58) Field of Classification Search
None
See application file for complete search history.

(56) References Cited

U.S. PATENT DOCUMENTS

| | | | |
|---|---|---|---|
| 7,987,034 B2 | 7/2011 | Taffin | |
| 2001/0020206 A1* | 9/2001 | Nishimura | ............. F16H 61/16 |
| | | | 701/54 |
| 2010/0076653 A1* | 3/2010 | Ronge | ............ B60W 30/18027 |
| | | | 701/58 |
| 2012/0220422 A1* | 8/2012 | Wurthner | ............. B60W 10/02 |
| | | | 477/79 |
| 2013/0131948 A1 | 5/2013 | Iwao et al. | |

FOREIGN PATENT DOCUMENTS

| | | |
|---|---|---|
| JP | 64-30959 | 2/1989 |
| JP | 08-132926 | 5/1996 |
| JP | 11-182665 | 7/1999 |
| JP | 2008-94142 | 4/2008 |
| JP | 5462091 | 4/2014 |
| JP | 5516306 | 6/2014 |

\* cited by examiner

*Primary Examiner* — Edwin A Young
(74) *Attorney, Agent, or Firm* — Brinks Gilson & Lione

(57) ABSTRACT

A method for selecting a gear when Start-Stop Coasting (SSC) is released may include: determining whether a traveling vehicle satisfies a condition for releasing SSC after entry into SSC (S100); selecting a gear input to a transmission (S200) when the traveling vehicle satisfies the condition for releasing SSC after entry into SSC; determining a road gradient (S300) when the traveling vehicle satisfies the condition for releasing SSC after entry into SSC; and correcting the selected gear according to a pre-stored correction map so as to correspond to the determined road gradient.

12 Claims, 7 Drawing Sheets

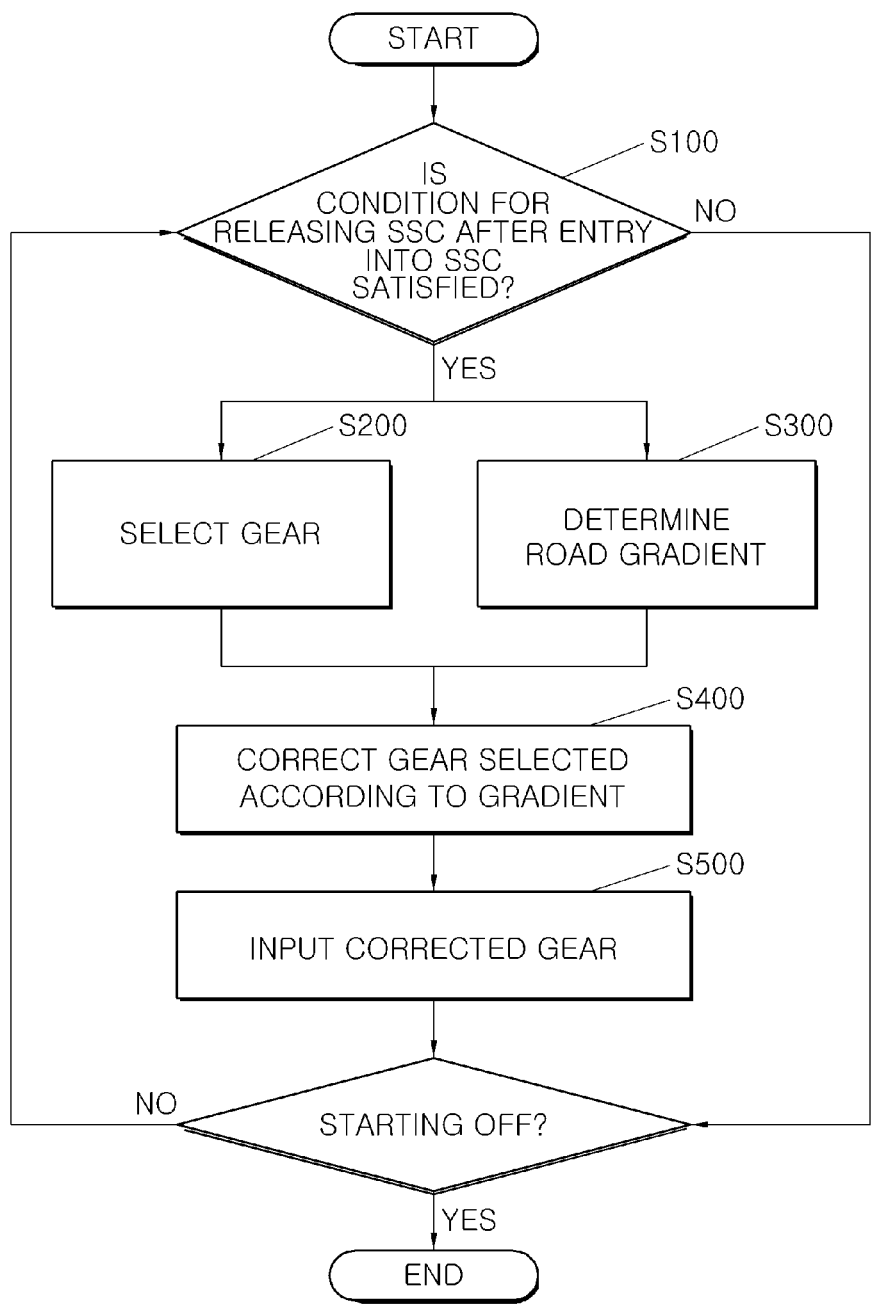

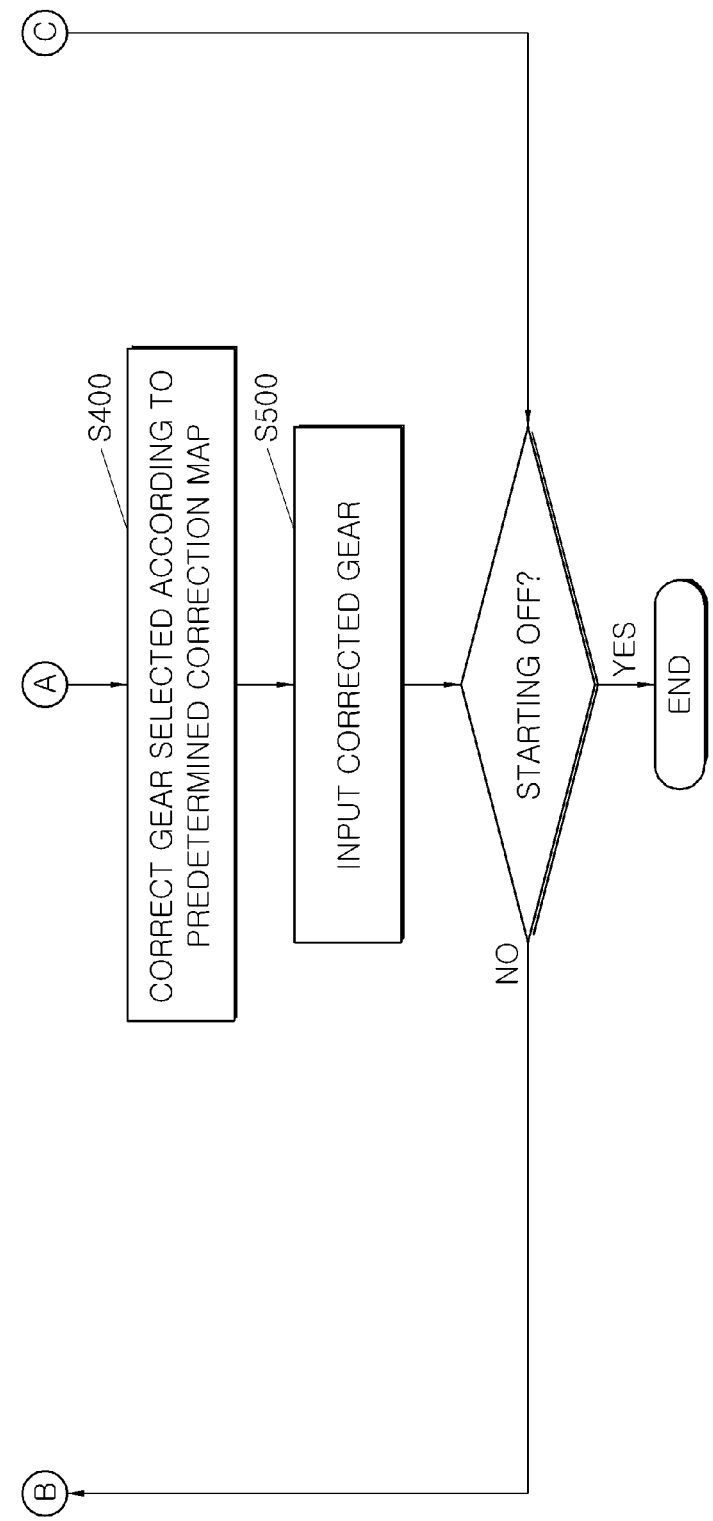

METHOD AND APPARATUS FOR SELECTING GEAR WHEN SSC IS RELEASED

CROSS-REFERENCE TO RELATED APPLICATIONS

This application claims priority to and the benefit of Korean Patent Application No. 10-2015-0064525, filed on May 8, 2015, which is incorporated herein by reference in its entirety.

FIELD

The present disclosure relates to a method and apparatus for selecting a gear when SSC is released.

BACKGROUND

The statements in this section merely provide background information related to the present disclosure and may not constitute prior art.

As the dissatisfaction of consumers is recently increased due to a difference between certified fuel efficiency and actual fuel efficiency when traveling on the road, an improvement of the actual fuel efficiency is increasingly important. Accordingly, technology for improving actual fuel efficiency when traveling on the road by using driving condition of a driver, surrounding traffic, road information, etc., as well as technology for controlling vehicle systems, has been researched and developed in vehicle industry.

We have discovered that a technique of searching and guiding an economic driving route using IT and traffic information, a technique of guiding driving at high fuel efficiency by memorizing road gradient information and previous traveling patterns, a technique of controlling charge/discharge of a battery according to the SOC (state of charge) level thereof by predicting and determining road gradient and traffic information, and a technique of selectively controlling a traveling mode such that fuel consumption is reduced based on a destination route and traffic information by means of map information DB, are areas to be developed.

One technique for improving the fuel efficiency is an SSC (Start-Stop Coasting) technique. FIGS. 1A and 1B are diagrams for explaining SSC. Referring to FIGS. 1A and 1B, SSC is a technique of cutting off fuel supply to an engine (fuel cut) and cutting off power transfer to a transmission (clutch off) during coasting (see FIG. 1A). We have discovered that the mileage of a vehicle to which the SSC is applied is increased compared to that of the conventional vehicle since engine drag torque is cut off (see FIG. 1B).

In the SCC of the related art, the gear when the SCC is released (when restart is performed) is set according to a pre-stored gear map. The pre-stored gear map is mapped so as to select the gear according to a vehicle speed or the like, regardless of a road gradient. We have discovered that, for this reason, gear shifting may be additionally required according to the road gradient after the SCC is released. In addition, drivability of the vehicle may be deteriorated due to the additional gear shifting according to the road gradient.

SUMMARY

The present disclosure provides a method and apparatus for selecting a gear when SSC is released, capable of inhibiting additional gear shifting according to a road gradient after SCC is released.

The present disclosure can be understood by the following description, and become apparent with reference to the embodiments of the present disclosure.

In accordance with the present disclosure, a method for selecting a gear when SSC is released includes determining whether a traveling vehicle satisfies a condition for releasing SSC after entry into SSC (S100), selecting a gear input to a transmission (S200) when the traveling vehicle satisfies the condition for releasing SSC after entry into SSC, determining a road gradient (S300) when the traveling vehicle satisfies the condition for releasing SSC after entry into SSC, and correcting the selected gear according to a pre-stored correction map so as to correspond to the determined road gradient.

The method may further include inputting the corrected gear to the transmission (S500).

The predetermined condition for releasing SSC may be a condition in which an accelerator pedal or a brake pedal is operated or a vehicle speed is less than a predetermined speed.

The determining a road gradient (S300) may include measuring an acceleration of the vehicle (S310).

The determining a road gradient (S300) may include determining a gradient corresponding to the acceleration of the vehicle measured according to a pre-stored gradient map (S320).

In one form, the determining a road gradient (S300) may include determining whether the measured acceleration of the vehicle is equal to or less than a predetermined first reference value (S330).

The determining a road gradient (S300) may include determining whether the measured acceleration of the vehicle is equal to or greater than a predetermined second reference value (S340) when the measured acceleration of the vehicle is equal to or less than the predetermined first reference value.

The determining a road gradient (S300) may include determining that a road is a flat road (S350) when the measured acceleration of the vehicle is equal to or greater than the predetermined second reference value.

The determining a road gradient (S300) may include determining that a road is an uphill road (S360) when the measured acceleration of the vehicle is less than the predetermined second reference value.

The determining a road gradient (S300) may include determining that a road is a downhill road (S370) when the measured acceleration of the vehicle is greater than the predetermined first reference value.

In another form, there is provided a storage medium storing the method for selecting a gear when SSC is released.

In still another form, an apparatus for selecting a gear when SSC is released includes a storage medium (100), a detection unit (200) detecting whether an accelerator pedal is operated, whether a brake pedal is operated, and a speed and acceleration of a vehicle, and a control unit (300) selecting a gear input to a transmission (400) when SSC is released, correcting the gear according the acceleration of the vehicle, and commanding the input of the corrected gear to the transmission (400).

The detection unit (200) may include an accelerator pedal detection section (210), a brake pedal detection section (220), a vehicle speed detection section (230), and a vehicle acceleration detection section (240).

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 2 and 3 are flowcharts illustrating a method for selecting a gear when SSC is released;

FIGS. 4A and 4B are flowcharts illustrating a method for selecting a gear when SSC is released.

Figure 1A:
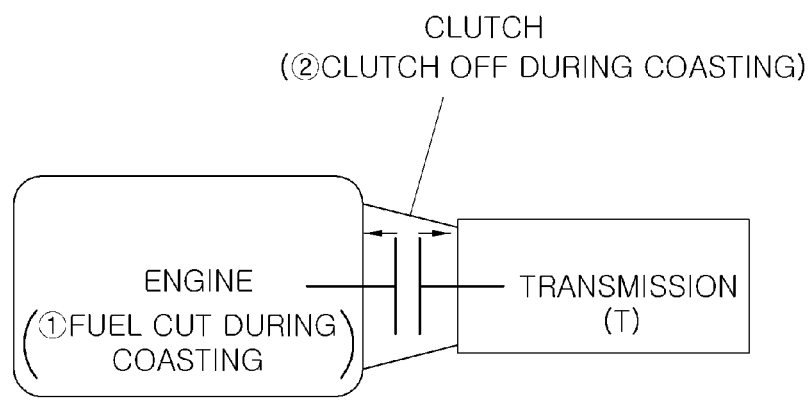
FIGS. 1A and 1B are diagrams for explaining SSC.
Figure 1B:
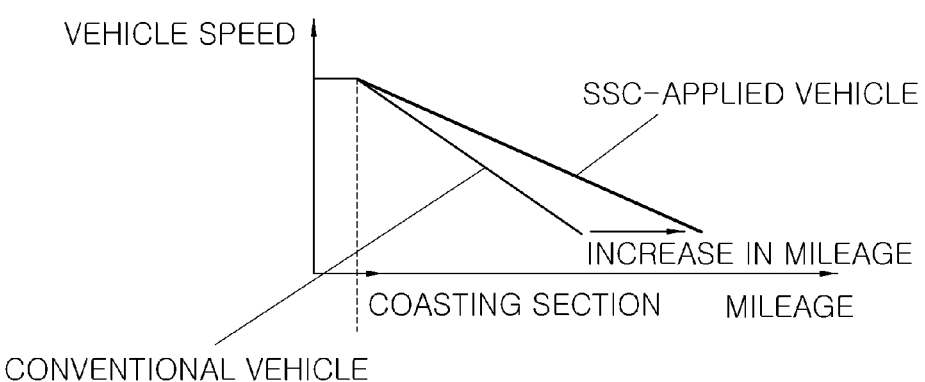

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

On the basis of the principle that the inventor can define the appropriate concept of a term in order to describe his/her own present disclosure in the best way, it should be construed as meaning and concepts for complying with the technical idea of the present disclosure. Accordingly, the embodiments described in the present specification and the construction shown in the drawings are nothing but one form of the present disclosure, and it does not cover all the technical ideas of the present disclosure. Thus, it should be understood that various changes and modifications may be made at the time of filing the present application. In addition, detailed descriptions of functions and constructions well known in the art may be omitted to avoid unnecessarily obscuring the gist of the present disclosure.

Figure 3:
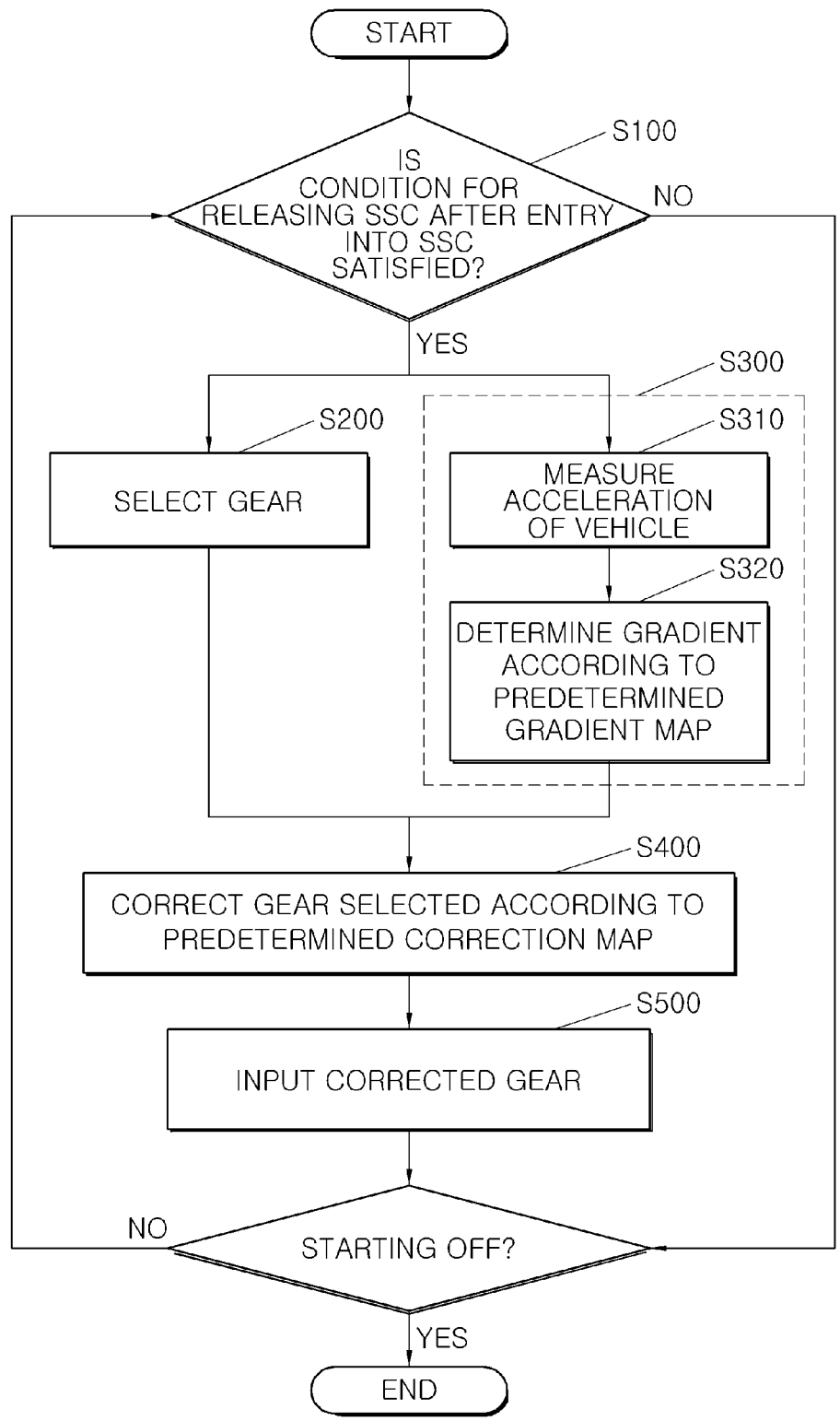

Referring to FIGS. 2 and 3, the method for selecting a gear when SSC is released according to the embodiment of the present disclosure includes a step S100 of determining whether a traveling vehicle satisfies a condition for releasing SSC after entry into SSC, a step S200 of selecting a gear input to a transmission when the traveling vehicle satisfies the condition for releasing SSC after entry into SSC, a step S300 of determining a road gradient when the traveling vehicle satisfies the condition for releasing SSC after entry into SSC, and a step S400 of correcting the selected gear according to a pre-stored correction map so as to correspond to the determined road gradient. In addition, the method for selecting a gear when SSC is released further includes a step S500 of inputting the corrected gear to the transmission.

In the step S100 of determining whether a traveling vehicle satisfies a condition for releasing SSC after entry into SSC, the predetermined condition for releasing SSC is a condition in which an accelerator pedal or a brake pedal is operated or a vehicle speed is less than a predetermined speed. In addition, the predetermined condition of entry into SSC is a condition in which the accelerator pedal and the brake pedal are not operated and the vehicle speed is equal to or greater than a predetermined speed. In this case, the predetermined speed may be differently set according to the type of vehicle.

In the step S200 of selecting a gear input to a transmission, the gear may be selected according to a pre-stored gear map. The pre-stored gear map may be mapped so as to select the gear according to a vehicle speed, but the present disclosure is not limited thereto. For example, the pre-stored gear map may be differently mapped according to the type of vehicle.

The step S300 of determining a road gradient includes a step S310 of measuring an acceleration of the vehicle, and a step S320 of determining a gradient corresponding to the acceleration of the vehicle measured according to a pre-stored gradient map. The pre-stored gradient map is mapped so as to determine the road gradient according to the acceleration of the vehicle in the SSC state. Thus, it may be possible to rapidly determine (measure) the road gradient corresponding to the measured acceleration of the vehicle.

In the step S400 of correcting the selected gear, the selected gear is corrected according to the pre-stored correction map so as to correspond to the determined road gradient. That is, even though the gear is selected regardless of the road gradient when the SSC is released (when restart is performed), it may be possible to inhibit additional gear shifting according to the road gradient after the SCC is released and thus to improve drivability of the vehicle, by correcting the selected gear according to the pre-stored correction map so as to correspond to the road gradient. The pre-stored correction map is mapped with consideration for the speed and acceleration of the vehicle and the road gradient as a whole such that the selected gear is corrected to a gear capable of inhibiting the additional gear shifting according to the road gradient after the SCC is released and thus improving the drivability of the vehicle.

Figure 4A:
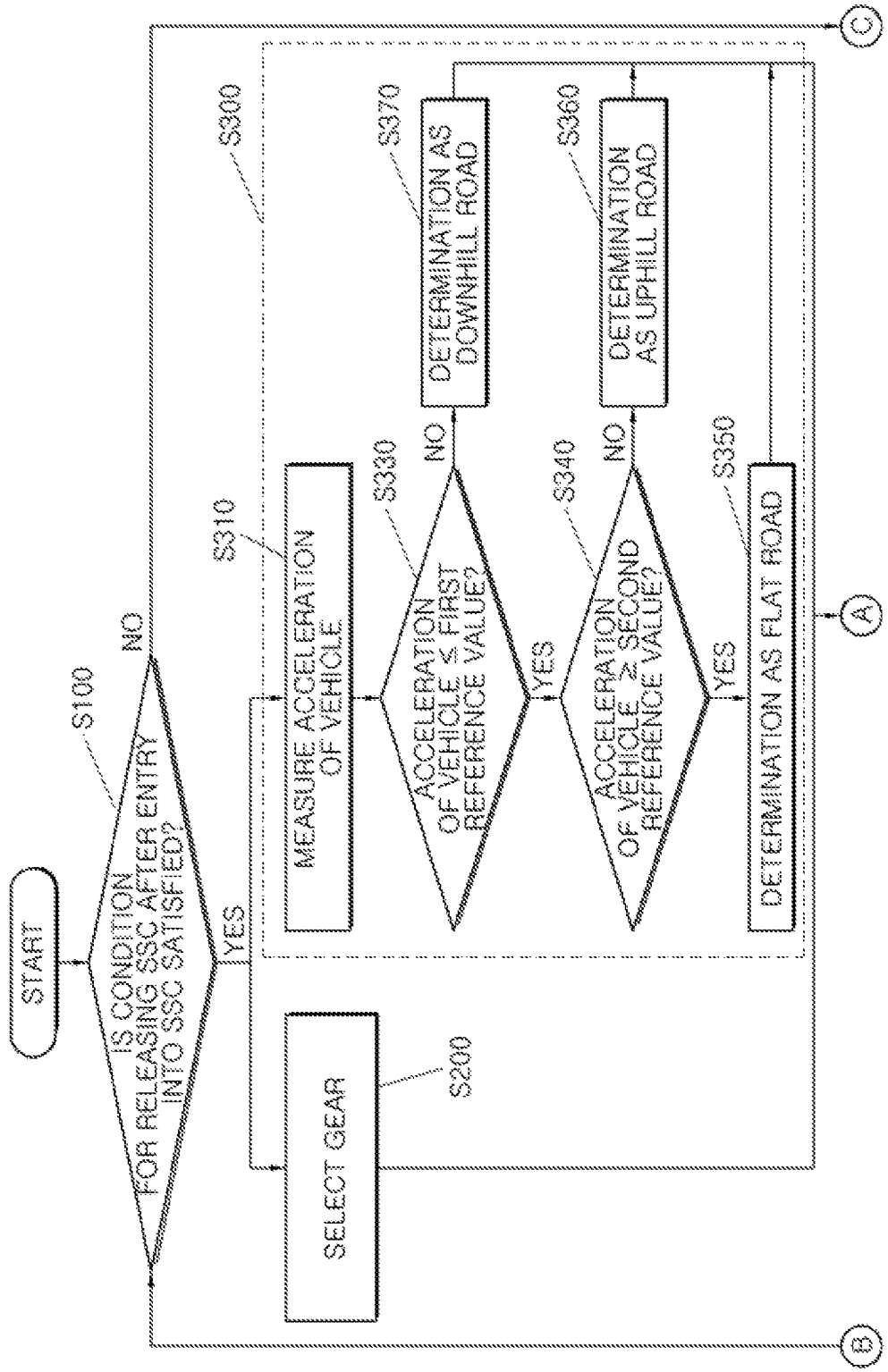

FIGS. 4A and 4B are flowcharts illustrating a method for selecting a gear when SSC is released according to the present disclosure. Referring to FIG. 4A, in the method for selecting a gear when SSC is released, the above-mentioned step S300 of determining a road gradient includes a step S310 of measuring an acceleration of the vehicle, a step S330 of determining whether the measured acceleration of the vehicle is equal to or less than a predetermined first reference value, a step S340 of determining whether the measured acceleration of the vehicle is equal to or greater than a predetermined second reference value when the measured acceleration of the vehicle is equal to or less than the predetermined first reference value, a step S350 of determining that the road is a flat road when the measured acceleration of the vehicle is equal to or greater than the predetermined second reference value, a step S360 of determining that the road is an uphill road when the measured acceleration of the vehicle is less than the predetermined second reference value, and a step S370 of determining that the road is a downhill road when the measured acceleration of the vehicle is greater than the predetermined first reference value.

That is, the road is determined to be the downhill road when the measured acceleration of the vehicle is greater than the predetermined first reference value, the road is determined to be the uphill road when the measured acceleration of the vehicle is less than the second reference value, and the road is determined to be the flat road when the measured acceleration of the vehicle is equal to or greater than the second reference value and is equal to or less than the first reference value. The first and second reference values may be differently set according to the type of vehicle.

Thus, it may be possible to determine the inclined state of the road according to the acceleration of the vehicle, without a need to separately map or store the gradient map, unlike the embodiment illustrated in FIGS. 2 and 3. Therefore, it may be possible to manufacture the vehicle at low cost by reducing costs for mapping and storing the gradient map, and to improve quality.

Figure 5:
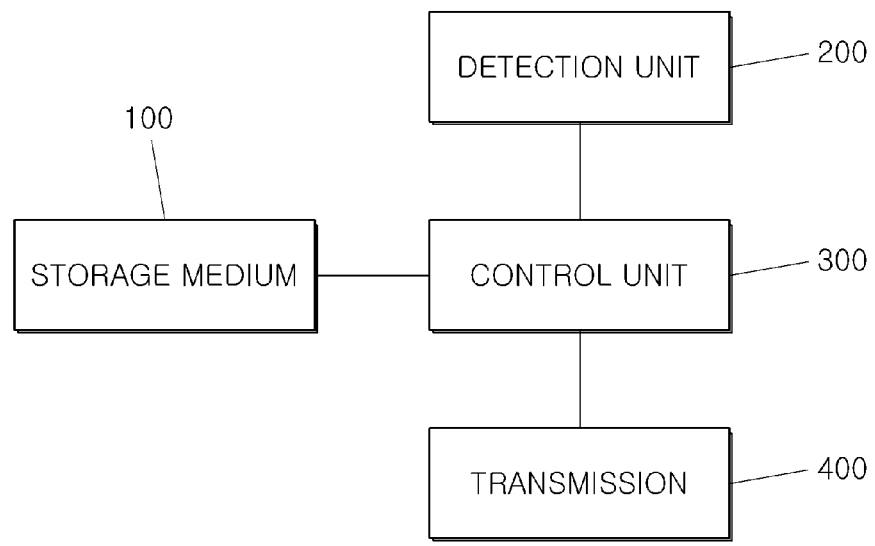
FIGS. 5 and 6 are block diagrams illustrating an apparatus for selecting a gear when SSC is released.
Figure 6:
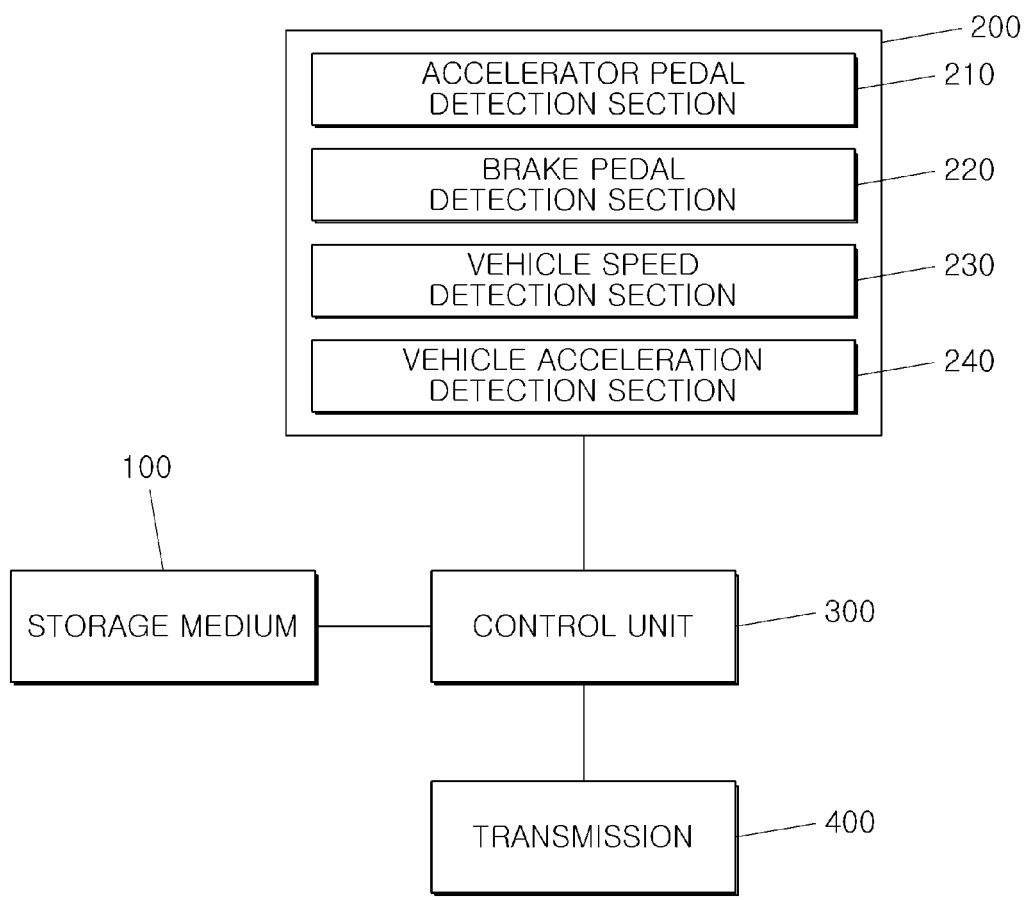

FIGS. 5 and 6 are block diagrams illustrating an apparatus for selecting a gear when SSC is released according to a further embodiment of the present disclosure. Referring to FIGS. 5 and 6, the apparatus for selecting a gear when SSC is released includes a storage medium 100 which stores a method for selecting a gear when SSC is released, a detection unit 200 which detects whether an accelerator pedal is operated, whether a brake pedal is operated, and a speed and acceleration of a vehicle, and a control unit 300 which selects a gear input to a transmission 400 when SSC is release, corrects the gear according the acceleration of the vehicle, and commands the input of the corrected gear to the transmission 400.

The detection unit 200 includes an accelerator pedal detection section 210, a brake pedal detection section 220, a vehicle speed detection section 230, and a vehicle acceleration detection section 240.

In accordance with the embodiments of the present disclosure, it is possible to inhibit additional gear shifting according to a road gradient after SCC is released and thus to improve drivability of a vehicle.

While the present disclosure has been described with respect to the specific embodiments, it will be apparent to those skilled in the art that various changes and modifications may be made without departing from the spirit and scope of the present disclosure.

What is claimed is:

1. A method for selecting a gear when Start-Stop Coasting (SSC) is released, the method comprising:
   determining whether a traveling vehicle satisfies a condition for releasing SSC after entry into SSC;
   selecting a gear input to a transmission when the traveling vehicle satisfies the condition for releasing SSC after the entry into SSC;
   determining a road gradient when the traveling vehicle satisfies the condition for releasing SSC after the entry into SSC; and
   correcting a selected gear according to a pre-stored correction map so as to correspond to the determined road gradient.

2. The method of claim 1, further comprising inputting a corrected gear to the transmission.

3. The method of claim 1, wherein the condition for releasing SSC is a condition in which an accelerator pedal or a brake pedal is operated, or a vehicle speed is less than a predetermined speed.

4. The method of claim 1, wherein the determining a road gradient comprises measuring an acceleration of the traveling vehicle.

5. The method of claim 4, wherein the determining a road gradient comprises determining a gradient corresponding to the acceleration of the traveling vehicle measured according to a pre-stored gradient map.

6. The method of claim 4, wherein the determining a road gradient comprises determining whether the measured acceleration of the traveling vehicle is equal to or less than a predetermined first reference value.

7. The method of claim 6, wherein the determining a road gradient comprises determining whether the measured acceleration of the traveling vehicle is equal to or greater than a predetermined second reference value when the measured acceleration of the traveling vehicle is equal to or less than the predetermined first reference value.

8. The method of claim 7, wherein the determining a road gradient comprises determining that a road is a flat road when the measured acceleration of the traveling vehicle is equal to or greater than the predetermined second reference value.

9. The method of claim 7, wherein the determining a road gradient comprises determining that a road is an uphill road when the measured acceleration of the traveling vehicle is less than the predetermined second reference value.

10. The method of claim 6, wherein the determining a road gradient comprises determining that a road is a downhill road when the measured acceleration of the traveling vehicle is greater than the predetermined first reference value.

11. An apparatus for selecting a gear when Start-Stop Coasting (SSC) is released, the apparatus comprising:
    a storage medium configured to store a method for selecting a gear when SSC is released;
    a detection unit configured to detect whether an accelerator pedal is operated, whether a brake pedal is operated, and to detect a speed and an acceleration of a vehicle; and
    a control unit configured to select a gear input to a transmission when SSC is released, correct the gear input according the acceleration of the vehicle, and command the corrected gear input to the transmission.

12. The apparatus of claim 11, wherein the detection unit comprises an accelerator pedal detection section, a brake pedal detection section, a vehicle speed detection section, and a vehicle acceleration detection section.

* * * * *